United States Patent [19]

Yamada et al.

[11] Patent Number: 5,312,574
[45] Date of Patent: May 17, 1994

[54] METHOD FOR SINTERING CERAMIC FORMED BODIES

[75] Inventors: Kenichi Yamada; Nirohiko Sakamoto, both of Nagaokakyo, Japan

[73] Assignee: Murata Manufacturing Co. Ltd., Japan

[21] Appl. No.: 926,716

[22] Filed: Aug. 7, 1992

[30] Foreign Application Priority Data

Aug. 8, 1991 [JP] Japan .................................. 3-199430

[51] Int. Cl.$^5$ .............................................. C04B 33/32
[52] U.S. Cl. .......................................... 264/58; 264/64; 432/93
[58] Field of Search .................................. 264/58, 64

[56] References Cited

U.S. PATENT DOCUMENTS 1,627,720  5/1927  Wilson ................................ 264/58
3,111,397  11/1963  Metz .................................. 264/64
3,249,662  5/1966  Gie .................................... 264/64
4,246,215  1/1981  Pasco ................................. 264/64
4,767,582  8/1988  Maruyama ......................... 264/64

*Primary Examiner*—James Derrington
*Attorney, Agent, or Firm*—Ostrolenk, Faber, Gerb & Soffen

[57] ABSTRACT

A method of sintering ceramic formed bodies, in which a container for sintering is disposed in a sintering space of a sintering furnace, and atmospheric gas is introduced from an atmospheric gas inlet port provided on a bottom surface of the container for sintering into a large number of ceramic formed bodies piled up in the container for sintering, thereby to sinter the large number of ceramic formed bodies piled upon each other, while introducing the atmospheric gas into spaces between the ceramic formed bodies.

4 Claims, 5 Drawing Sheets

METHOD FOR SINTERING CERAMIC FORMED BODIES

BACKGROUND OF THE INVENTION

1. Field of the Invention

The present invention relates generally to a method of and an apparatus for sintering ceramic formed bodies, and more particularly, to a sintering method and a sintering apparatus which allow atmospheric gas to be controlled reliably and efficiently.

2. Description of the Prior Art

In mass-provided ceramic electronic components and the like, a large number of ceramic formed bodies are usually sintered at the same time. For sintering such a large number of ceramic formed bodies, a tunnel furnace and a batch type sintering furnace are generally used. The tunnel furnace is used for sintering ceramic formed bodies which can be sintered according to a relatively simple temperature profile and requires little atmospheric control. On the other hand, the batch type sintering furnace is used for sintering ceramic formed bodies which require special atmospheric control.

Even when ceramic formed bodies are sintered using either one of the above described sintering furnaces, a large number of ceramic formed bodies are usually piled on a bottom board 1 as shown in FIG. 2A or in a container for sintering 3 as shown in FIG. 2B, and the bottom board 1 or the container for sintering 3 is disposed in the sintering furnace. In addition, a plurality of bottom boards 1 are usually piled upon each other and a large number of ceramic formed bodies (a lump of a large number of ceramic formed bodies is indicated by oblique hatching and designated by reference numeral 2) are disposed on each of the bottom boards 1, as shown in FIG. 2A, so as to enhance mass productivity. Similarly, a plurality of containers for sintering 3 are piled upon each other and are put into the sintering furnace, as shown in FIG. 2B, thereby to enhance mass productivity.

Meanwhile, although the bottom boards 1 or the containers for sintering 3 are disposed in the above described sintering furnace when special atmospheric control at the time of sintering is required, atmospheric gas must be uniformly supplied to spaces between a large number of ceramic formed bodies. In addition, gas exchange on the surface of each of the ceramic formed bodies must smoothly progress. Accordingly, the gas must be uniformly discharged from the spaces between the ceramic formed bodies. In the method in which the plurality of bottom boards 1 are piled upon each other as shown in FIG. 2A, therefore, the bottom boards 1 are separated from each other by supports 4, thereby to smoothly supply the atmospheric gas to the ceramic formed bodies. On the other hand, in the structure in which the containers for sintering 3 are piled as shown in FIG. 2B, notches 3a for smoothly introducing the atmospheric gas are formed in the upper part of each of the containers for sintering 3.

In the above described sintering method using the bottom boards 1 or the containers for sintering 3, the atmospheric gas is smoothly introduced into spaces formed between the bottom boards 1 and the containers for sintering 3. However, it is difficult to cause the atmospheric gas to uniformly spread over the large number of piled ceramic formed bodies.

More specifically, as shown in a cross sectional view of FIG. 3, atmospheric gas introduced into a lump 2 of a large number of ceramic formed bodies is smoothly supplied to ceramic formed bodies located in a portion (a portion indicated by an arrow A) in the vicinity of the surface of the lump 2 of the ceramic formed bodies, while not easily spread over ceramic formed bodies located in a portion indicated by an arrow B, that is, ceramic formed bodies located in a lower central part of the lump 2.

Furthermore, it is difficult to uniformly discharge gas after being subjected to gas exchange on the surface of each of the ceramic formed bodies in the lump 2. That is, the gas is smoothly discharged from spaces between the ceramic formed bodies located in the portion indicated by the arrow A in the vicinity of the surface of the lump 2, while the discharging speed of the gas from spaces between the ceramic formed bodies located in the portion indicated by the arrow B is significantly lower.

As described above, in the conventional sintering method using the bottom boards 1 or the containers for sintering 3, there arises a difference in atmosphere given between the ceramic formed bodies located in the vicinity of the surface of the lump 2 of the piled ceramic formed bodies and the ceramic formed bodies located in the inner part thereof. As a result, a sintered body which is not sufficiently sintered, a sintered body in which holes remain and a sintered body whose electrical characteristics are degraded are liable to be formed.

SUMMARY OF THE INVENTION

An object of the present invention is to provide a method of and an apparatus for sintering ceramic formed bodies, which allow, in sintering ceramic formed bodies requiring atmospheric control, atmospheric gas to be uniformly supplied to the surfaces of a large number of ceramic formed bodies and the atmospheric gas supplied to spaces between the ceramic formed bodies to be discharged at a uniform speed without staying.

A sintering method of disposing in a sintering furnace a container for sintering containing a large number of ceramic formed bodies to sinter the ceramic formed bodies according to the present invention is characterized in that a container for sintering having an atmospheric gas inlet port provided in its inner wall portion in contact with the large number of ceramic formed bodies piled upon each other is used as the above-described container for sintering, and the ceramic formed bodies are sintered while introducing the atmospheric gas from the above-described atmospheric gas inlet port.

Furthermore, a sintering apparatus for sintering ceramic formed bodies according to the present invention comprises a sintering furnace having a sintering space for sintering ceramic formed bodies in its inner part and a container for sintering disposed in the sintering space of the above-described sintering furnace for containing a large number of ceramic formed bodies, the above-described container for sintering having an atmospheric gas inlet port provided in its inner wall portion in contact with the large number of piled ceramic formed bodies.

In the sintering method and the sintering apparatus according to the present invention, the atmospheric gas is supplied from the atmospheric gas inlet port of the container for sintering. Since the atmospheric gas inlet port is provided in the inner wall portion in contact with the large number of ceramic formed bodies piled up, the atmospheric gas introduced is directly supplied to a lump of the large number of ceramic formed bodies, so that spaces between the ceramic formed bodies in the lump become paths for the atmospheric gas. As a result, the atmospheric gas is uniformly supplied to the surface of each of the ceramic formed bodies in the lump of the large number of ceramic formed bodies, and gas exchange on the surfaces of the ceramic formed bodies smoothly progresses. Consequently, the gas is discharged from the lump of the ceramic formed bodies efficiently.

Accordingly, the large number of ceramic formed bodies can be sintered reliably and uniformly, thereby making it possible to effectively prevent the occurrence of, for example, insufficient sintering and degradation of the electrical characteristics in a case where they are used as electronic components.

Additionally, the container for sintering is provided with the above-described atmospheric gas inlet port, and the atmospheric gas is supplied to the lump of the ceramic formed bodies directly from the atmospheric gas inlet port. Accordingly, the atmospheric gas need not be introduced into the entire sintering furnace. That is, atmospheric control of the entire sintering space of the sintering furnace need not be performed, thereby making it possible to conserve the amount of atmospheric gas used. Consequently, it is possible to reduce the cost of the ceramic sintered bodies obtained.

Furthermore, the atmospheric gas can be uniformly supplied to the spaces between the large number of ceramic formed bodies piled upon each other as described above, thereby making it possible to fill the container for sintering with more ceramic formed bodies with higher density and sinter the ceramic formed bodies and to also increase sintering efficiency of the ceramic formed bodies.

The present invention is suitably applicable to a method of sintering ceramic formed bodies in general requiring control of a sintering atmosphere.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4A:
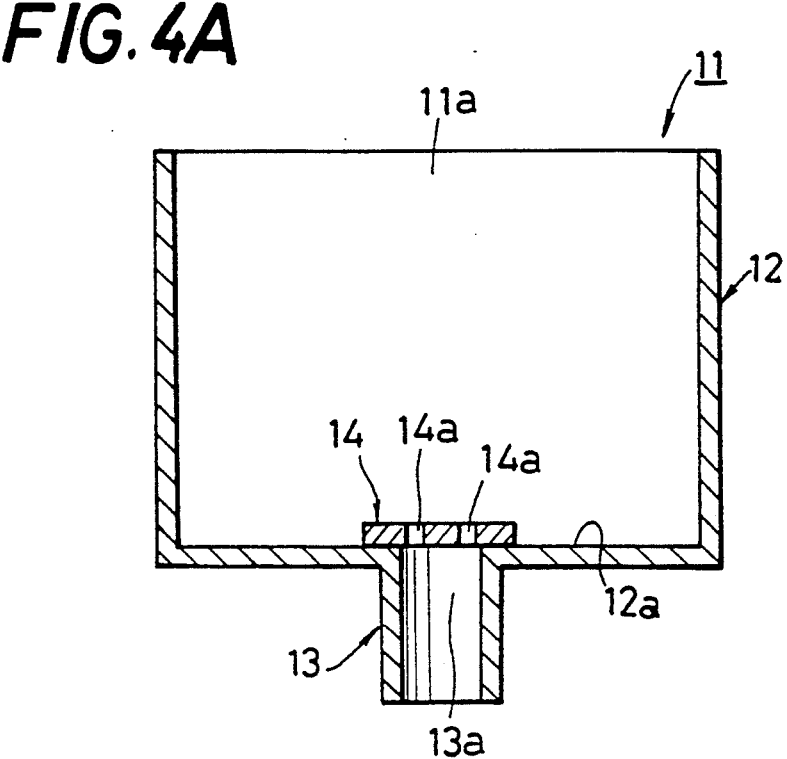
FIG. 4A is a vertical sectional view showing a container for sintering used in the embodiment of the present invention.
Figure 4B:
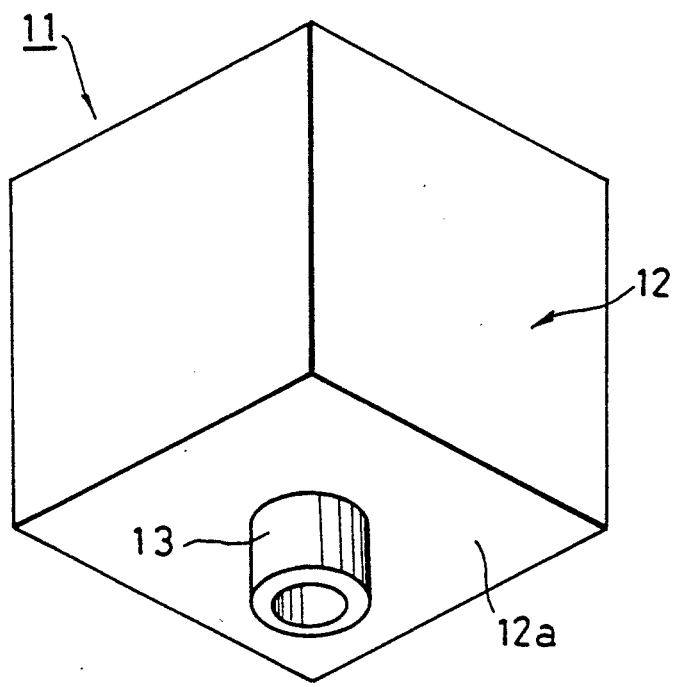
FIG. 4B is a perspective view showing the container for sintering as seen from below.

FIGS. 4A and 4B are cross sectional views showing a container for sintering used in a sintering apparatus according to an embodiment of the present invention and a perspective view showing the container for sintering as seen from below, respectively. A container for sintering 11 has a square cylindrical container body 12 having an opening 11a in its upper part. An atmospheric gas inlet cylinder 13 having an atmospheric gas inlet port 13a opened toward a bottom surface 12a of the container body 12 is provided beneath the container body 12. In addition, a perforated plate 14 having a number of through holes 14a for providing a plurality of gas inlet paths formed therein is disposed in a portion, which faces the bottom surface 12a of the container body 12, of the atmospheric gas inlet port 13a.

Figure 1:
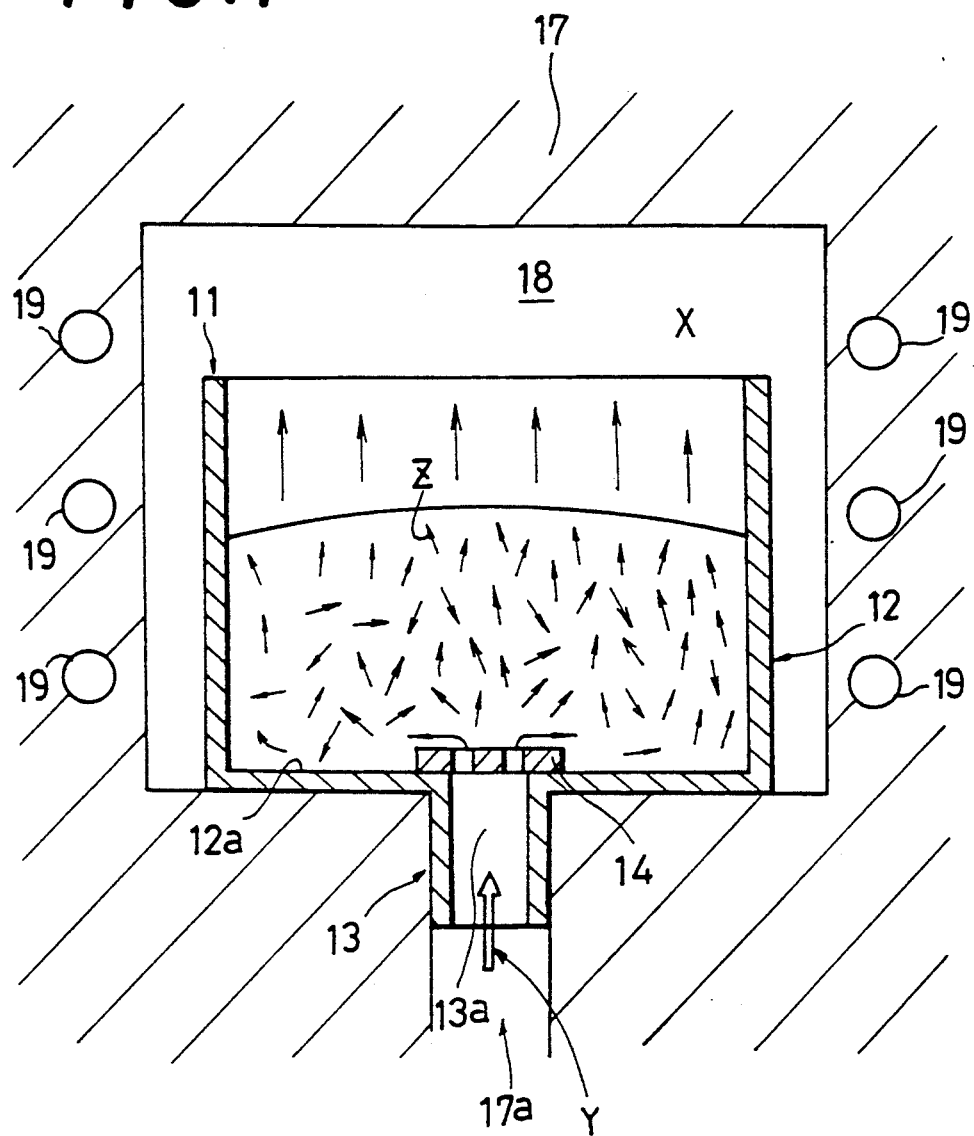
FIG. 1 is a cross sectional view illustrating a sintering apparatus and a sintering method according to an embodiment of the present invention.
Figure 5:
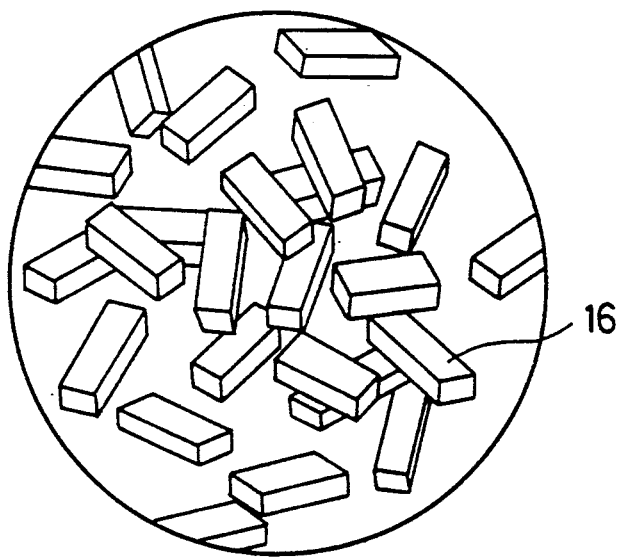
FIG. 5 is an enlarged perspective view showing ceramic formed bodies piled upon each other.

Description is now made of a sintering method using the above-described container for sintering 11 with reference to FIG. 1. In the case of sintering, a large number of ceramic formed bodies are contained in the above-described container for sintering 11. In FIG. 1, the large number of ceramic formed bodies are contained in the container for sintering 11, and the upper edge of the piled ceramic formed bodies is schematically indicated by a solid line X. That is, the large number of ceramic formed bodies are contained below the solid line X. As shown in an enlarged manner in FIG. 5, a large number of ceramic formed bodies 16 are arranged at random. The container for sintering 11 containing the large number of ceramic formed bodies 16 as described above is then disposed in a sintering space 18 of a batch type sintering furnace 17 shown in FIG. 1. The sintering furnace 17 is so constructed that an inlet flow path 17a for introducing atmospheric gas is formed on its lower surface, and the atmospheric gas inlet cylinder 13 of the container for sintering 11 is connected to the inlet flow path 17a, thereby to supply the atmospheric gas in the direction indicated by an arrow Y. Reference numeral 19 indicates heaters, which are provided so as to raise the temperature in the sintering space 18.

In the case of sintering, the temperature in the sintering space 18 is raised by the heaters 19 while introducing the atmospheric gas in the direction indicated by the arrow Y. As a result, the atmospheric gas is supplied to a lump of the large number of ceramic formed bodies through the through holes 14a of the perforated plate 14. In the lump of the ceramic formed bodies, the atmospheric gas is supplied as indicated by a lot of arrows Z, in random directions. That is, the atmospheric gas is supplied through spaces in an irregular shape between the large number of ceramic formed bodies. The atmospheric gas is thus introduced from a lower central part of the large number of piled ceramic formed bodies, and is moved upward through the spaces between the ceramic formed bodies as described above, thereby making it possible to smoothly supply the atmospheric gas to the surfaces of all the ceramic formed bodies piled upon each other. Moreover, the atmospheric gas supplied is subjected to gas exchange on the surface of each of the ceramic formed bodies, to be smoothly discharged upward.

Although in the above-described embodiment, the container body 12 and the atmospheric gas inlet cylinder 13 of the container for sintering 11 are respectively formed in a square cylindrical shape and a circular cylindrical shape, the container body 12 may be formed in another shape such as a circular cylindrical shape, and the atmospheric gas inlet cylinder 13 may be formed in another shape such as a square cylindrical shape.

Furthermore, the perforated plate 14 is so provided as to supply the atmospheric gas supplied in more directions, as well as to prevent the piled ceramic formed bodies from being dropped into the atmospheric gas inlet cylinder 13. However, the perforated plate 14 may be omitted depending on the type and the material of the ceramic formed bodies used and the inner diameter of the atmospheric gas inlet cylinder 13.

Description is now made of a concrete experimental example in which the above-described embodiment is applied to a method of fabricating a ceramic multilayer capacitor having dimensions of 2 mm by 1.25 mm by 0.7 mm and having a capacity of 1000 pF. First, a large number of ceramic formed bodies made of a material mainly composed of $BaTiO_3$ are prepared. The sintering apparatus shown in FIG. 1 is used. Air is introduced as atmospheric gas from the atmospheric gas inlet cylinder 13 at a speed of 0.2 liters per minute, and the ceramic formed bodies are sintered at a sintering temperature of 130° C. for two hours, to obtain a large number of multilayer capacitors. The inner diameter of the atmospheric gas inlet cylinder 13 in the sintering apparatus used is 10 mm.

Figure 2A:
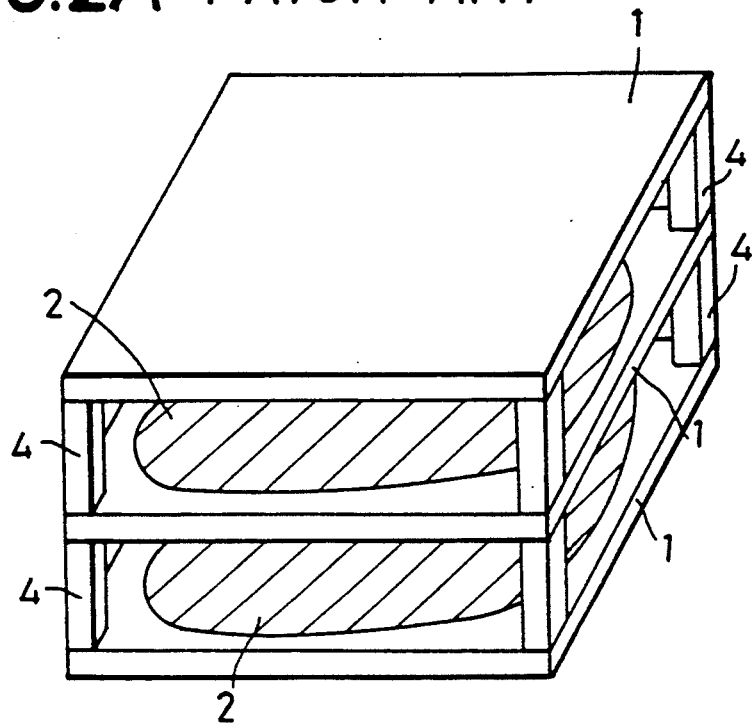
FIG. 2A is a perspective view illustrating bottom boards used in the conventional sintering method.
Figure 2B:
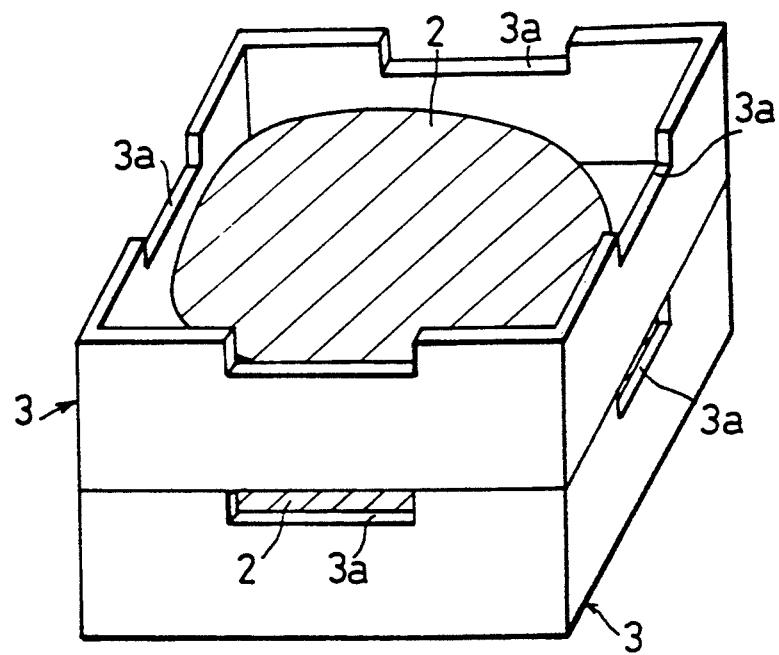
FIG. 2B is a perspective view of containers for sintering used in the conventional method.
Figure 3:
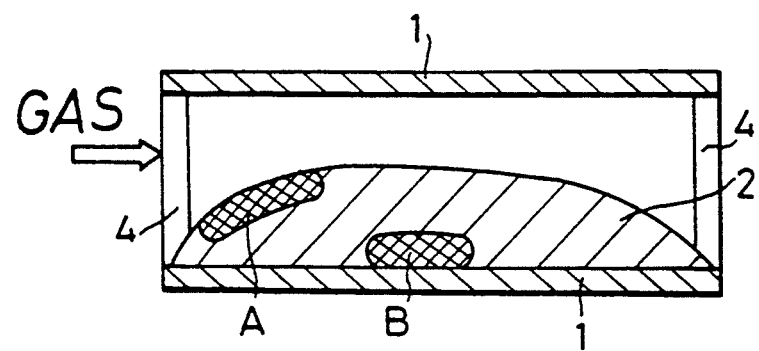
FIG. 3 is a cross sectional view illustrating the problems in the conventional method.

For comparison, bottom boards 1 shown in FIG. 2A are used, to sinter a large number of ceramic formed bodies prepared in the same manner as the example. The bottom board used has dimensions of 70 mm long by 150 mm wide by 5 mm thick. In addition, atmospheric gas is introduced by introducing air into a sintering space of a batch type sintering furnace at a speed of 2.5 liters per minute.

100 multilayer capacitors are respectively chosen from a large number of multilayer capacitors obtained in the above-described sintering methods in the embodiment and the conventional example, to measure the variation in capacity. The measurements show that the variation in capacity is 4.0 CV/% in the multilayer capacitors obtained in the conventional method, while being significantly reduced to 2.5 CV/% in the multilayer capacitors obtained in the embodiment of the present invention. Therefore, it is considered that in the sintering method according to the embodiment of the present invention, the atmospheric gas is uniformly introduced into spaces between the large number of ceramic formed bodies and is discharged at a uniform speed.

Furthermore, a comparison between the sintering method according to the present embodiment using the atmospheric gas inlet cylinder having the above-described dimensions and the conventional sintering method using the bottom boards having the above-described dimensions proves that the number of ceramic formed bodies usable for sintering in the method according to the present embodiment is seven times that in the conventional method, so that a significant number of ceramic formed bodies can be sintered at one time in the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sintering method for sintering a plurality of ceramic formed bodies disposed in a container, said container disposed in a furnace for sintering, comprising the steps of:

introducing atmospheric gas through an atmospheric gas inlet port of said container, said atmospheric gas inlet port being provided in an inner wall portion of said container in contact with the plurality of ceramic formed bodies piled upon each other in said container, said container having a bottom surface and said atmospheric gas inlet port being disposed so as to open into the bottom surface of said container;

supplying the atmospheric gas directly to surfaces of the plurality of piled ceramic formed bodies by passing the atmospheric gas through spaces between the ceramic formed bodies; and sintering said plurality of ceramic formed bodies.

2. The sintering method according to claim 1, wherein a perforated plate having a plurality of through holes is disposed on the inner wall portion of the container for sintering above the atmospheric gas inlet port, wherein in said step of supplying the atmospheric gas passes through the plurality of through holes to pass the atmospheric gas in different directions through the plurality of piled ceramic formed bodies.

3. The sintering method according to claim 1, wherein said sintering furnace is provided with an atmospheric gas inlet flow path, and said atmospheric gas inlet port is connected to the atmospheric gas inlet flow path, wherein in the step of introducing the atmospheric gas flows through the atmospheric gas inlet flow path into said atmospheric gas inlet port.

4. The sintering method according to claim 1, wherein in the step of supplying, the atmospheric gas is supplied from an atmospheric gas inlet cylinder formed integrally with said container for sintering, a portion of said atmospheric gas inlet cylinder which faces the container for sintering forming said atmospheric gas inlet port.

* * * * *